United States Patent
Hoyer et al.

(10) Patent No.: US 9,328,682 B2
(45) Date of Patent: May 3, 2016

(54) REGULATING STRATEGY FOR A CATALYTIC CONVERTER CONCEPT FOR EXHAUST-GAS AFTERTREATMENT HAVING A PLURALITY OF NITROGEN OXIDE STORAGE CATALYTIC CONVERTERS

(75) Inventors: Ruediger Hoyer, Alzenau-Hoerstein (DE); Stefan Franoschek, Nettetal (DE); Stephan Eckhoff, Alzenau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 1089 days.

(21) Appl. No.: 13/121,083

(22) PCT Filed: Sep. 21, 2009

(86) PCT No.: PCT/EP2009/006809
§ 371 (c)(1),
(2), (4) Date: Aug. 3, 2011

(87) PCT Pub. No.: WO2010/034452
PCT Pub. Date: Apr. 1, 2010

(65) Prior Publication Data
US 2011/0277450 A1   Nov. 17, 2011

(30) Foreign Application Priority Data

Sep. 25, 2008   (DE) .......................... 10 2008 048 854

(51) Int. Cl.
*F01N 3/00*   (2006.01)
*F01N 3/10*   (2006.01)
(Continued)

(52) U.S. Cl.
CPC .......... *F02D 41/0275* (2013.01); *F01N 3/0814* (2013.01); *F01N 3/0842* (2013.01);
(Continued)

(58) Field of Classification Search
CPC . F01N 13/009; F01N 13/0093; F01N 13/011;
F01N 2560/14; F01N 2560/026; F01N 3/0814;
F01N 3/0842; F01N 3/0871; F01N 9/00;
F02D 41/0275; F02D 41/1441; F02D 41/1463;
Y02T 10/47

USPC ............ 60/276, 285, 287, 288, 295, 297, 301
See application file for complete search history.

(56) References Cited

U.S. PATENT DOCUMENTS 4,961,917 A   10/1990   Byrne
6,044,644 A   4/2000   Hu et al.
(Continued)

FOREIGN PATENT DOCUMENTS

DE   199 18 756   10/2000
DE   103 35 785   3/2005
(Continued)

OTHER PUBLICATIONS

Miyoshi et al., "Development of New Concept Three-Way Catalyst for Automotive Lean-Burn Engines", SAE 950809, International Congress and Exposition, Detroit, Michigan, Feb. 27-Mar. 2, 1995, pp. 120-130.

(Continued)

*Primary Examiner* — Jesse Bogue
*Assistant Examiner* — Diem Tran
(74) *Attorney, Agent, or Firm* — Smith, Gambrell & Russell, LLP (57) ABSTRACT

The present invention relates to a regulating strategy for a special catalytic converter for exhaust-gas aftertreatment. The catalytic converter concept is distinguished in that at least two nitrogen oxide storage catalytic converters are used in the exhaust section of a vehicle. The first, possibly close-coupled unit is followed by one or more nitrogen oxide storage catalytic converters, which are possibly situated in the underbody of the vehicle. The nitrogen oxide storage catalytic converters are then regenerated as a function of the exceedance of nitrogen oxide threshold vales downstream thereof.

27 Claims, 5 Drawing Sheets (51) Int. Cl.
*F02D 41/02* (2006.01)
*F01N 3/08* (2006.01)
*F01N 9/00* (2006.01)
*F01N 13/00* (2010.01)
F02D 41/06 (2006.01)
F02D 41/14 (2006.01)

(52) U.S. Cl.
CPC ............... *F01N3/0871* (2013.01); *F01N 9/00* (2013.01); *F01N 13/009* (2014.06); *F01N 13/0093* (2014.06); *F01N 13/011* (2014.06); *F02D 41/1463* (2013.01); F01N 2560/025 (2013.01); F01N 2560/026 (2013.01); F01N 2560/14 (2013.01); F02D 41/064 (2013.01); F02D 41/1441 (2013.01); Y02T 10/47 (2013.01)

(56) References Cited

U.S. PATENT DOCUMENTS

| | | |
|---|---|---|
| 6,254,842 B1 | 7/2001 | Hu et al. |
| 6,502,374 B1 * | 1/2003 | Llorca Chulia ............... 53/539 |
| 6,502,391 B1 | 1/2003 | Hirota et al. |
| 6,539,709 B2 | 4/2003 | Kubo et al. |
| 6,732,507 B1 * | 5/2004 | Stanglmaier et al. ........... 60/285 |
| 6,858,193 B2 | 2/2005 | Ruwisch et al. |
| 7,610,751 B2 * | 11/2009 | McCarthy et al. ............. 60/286 |
| 7,624,570 B2 | 12/2009 | Reuter et al. |
| 7,799,298 B2 | 9/2010 | Pfeifer et al. |
| 2001/0036432 A1 | 11/2001 | Hu et al. |
| 2001/0037643 A1 | 11/2001 | Kubo et al. |
| 2003/0125202 A1 | 7/2003 | Ruwisch et al. |
| 2004/0182069 A1 | 9/2004 | Goralski, Jr. et al. |
| 2006/0168948 A1 | 8/2006 | Xu et al. |
| 2007/0110650 A1 | 5/2007 | Pfeifer et al. |
| 2009/0229249 A1 | 9/2009 | Bremm et al. |
| 2010/0166628 A1 | 7/2010 | Soeger et al. |

FOREIGN PATENT DOCUMENTS

| | | |
|---|---|---|
| DE | 10 2005 018 497 | 10/2006 |
| EP | 1 152 140 | 11/2001 |
| EP | 1 256 704 | 11/2002 |
| EP | 1 317 953 | 6/2003 |
| EP | 1 529 944 | 5/2005 |
| JP | 2000-282849 A | 10/2000 |
| WO | 96/17671 | 6/1996 |
| WO | 2006/069652 | 7/2006 |
| WO | 2007137675 | 12/2007 |
| WO | 2008/012653 A2 | 1/2008 |
| WO | 2008/012653 A3 | 1/2008 |

OTHER PUBLICATIONS

Waltner et al, "Die zweite Generation der Benzindirekteinspritzung", ("The $2^{nd}$ Generation of Gasoline-Direct-Injection-Aspects of exhaust gas aftertreatment and catalytic converter development"), 15th Aachener Kolloquium Fahrzeug- und Motorentechnik 2006, pp. 1-29.

Schwarz et al., "Die neuen Vier- und Sechs- zylinder- Ottomotoren von BMW mit Schichtbrennverfahren", MTZ May 2007, vol. 68, pp. 332-340.

International Search Report for PCT/EP2009/006809 mailed Feb. 3, 2010.

\* cited by examiner

REGULATING STRATEGY FOR A CATALYTIC CONVERTER CONCEPT FOR EXHAUST-GAS AFTERTREATMENT HAVING A PLURALITY OF NITROGEN OXIDE STORAGE CATALYTIC CONVERTERS

The present invention relates to a regulating strategy for a catalytic converter concept for exhaust-gas aftertreatment. The catalytic converter concept is characterized in that at least two nitrogen oxide storage catalytic converters are used in the exhaust section of a vehicle, which nitrogen oxide storage catalytic converters are arranged spatially separate from one another in the exhaust section, with the first nitrogen oxide storage catalytic converter preferably being close-coupled.

Lean-operated internal combustion engines, so-called lean-burn engines, are operated predominantly, in particular with stratified injection, with a superstoichiometric air/fuel ratio, that is to say lean. A lean air/fuel mixture accordingly contains a higher oxygen concentration than is required for the complete combustion of the fuel. The corresponding exhaust gas therefore contains an excess of the oxidizing components oxygen ($O_2$), nitrogen oxides ($NO_x$) in relation to reducing exhaust-gas components such as carbon monoxide (CO), hydrogen ($H_2$) and hydrocarbons (HC). Lean exhaust gas conventionally contains 3 to 15% by volume of oxygen.

Lean-burn engines include diesel engines and lean-burn spark-ignition engines. Only in recent years have diesel engines been developed which, for short periods, may also be operated with rich air/fuel mixtures. In lean-burn spark-ignition engines, stoichiometric or even substoichiometric, that is to say rich, air/fuel preparation takes place in certain operating phases, such as for example full-load operation or a cold start.

Within the context of this invention, in addition to diesel engines and spark-ignition engines with gasoline direct injection and stratified-charge operation, conventional spark-ignition engines with substantially homogenous mixture preparation, which may be operated with air ratios of up to approximately 1.4, that is to say lean, are also regarded as predominantly lean-operated engines. Specially-developed lean-burn engines with gasoline direct injection may be operated with air ratios of up to 2.5, and the most modern lean-burn engines may even be operated with air ratios of greater than 5. In diesel vehicles, the air ratio may be as high as 25.

The air ratio $\lambda$ is often used instead of the air/fuel ratio to describe the operating mode of an internal combustion engine. Said air ratio $\lambda$ is the air/fuel ratio normalized to stoichiometric conditions; accordingly, the air ratio $\lambda=1$ describes an air/fuel mixture of stoichiometric composition. In lean-burn engines, the air ratio predominantly or always lies at values of greater than 1.

On account of the high oxygen content in the exhaust gas of lean-burn engines, the nitrogen oxides ($NO_x$) which are generated during the combustion cannot be continuously reduced, with the simultaneous oxidation of hydrocarbons and carbon monoxide to form nitrogen, by means of three-way catalytic converters, as is the case in stoichiometrically operated spark-ignition engines. The catalytic reduction of said nitrogen oxides ($NO_x$) can take place only in a stoichiometric to rich exhaust-gas mixture. To be able to continuously reduce nitrogen oxides in lean exhaust gas, use is made of special catalytic converters, such as for example HC-DeNO$_x$ catalytic converters or SCR catalytic converters. A further possibility for the reduction of the nitrogen oxides in lean exhaust gases is to use nitrogen oxide storage catalytic converters. Said nitrogen oxide storage catalytic converters, which are operated discontinuously, make it possible to store nitrogen oxides in lean exhaust gas and reduce the stored nitrogen oxides under stoichiometric to rich exhaust-gas conditions (SAE document SAE 950809). To adhere to future exhaust-gas standards, motor vehicles with lean-burn gasoline and diesel engines are already fitted with $NO_x$ storage catalytic converters (NSC).

To enable the buffering of the nitrogen oxides, high-grade metals are applied as catalytically active components and $NO_x$ storage materials to suitable supports, for example an inert honeycomb body composed of ceramic or metal. The nitrogen oxide storage material in turn is composed of the actual nitrogen oxide storage component which may be deposited in fine-particle form on a support material. As storage components, use is made predominantly of the basic oxides of the alkali metals, the earth alkali metals and the rare-earth metals, but in particular barium oxide, which react with the nitrogen oxides to form the corresponding nitrogen oxide compounds, for example nitrates. As catalytically active components, use is conventionally made of the high-grade metals from the platinum group, which are generally deposited together with the storage component on the support material. As support material, use is made predominantly of active aluminium oxide with a large surface area. The catalytically active components may however also be applied to a separate support material, such as for example active aluminium oxide.

Nitrogen oxides are composed, by definition, of nitrogen monoxide and nitrogen dioxide, wherein in the exhaust gas of a lean-burn engine, depending on the operating state of the engine, nitrogen monoxide constitutes up to approximately 50 to 90% of the nitrogen oxides which are present. In the lean, that is to say oxygen-rich, atmosphere, in addition to the HC and CO components, the nitrogen oxides are oxidized in the $NO_x$ storage catalytic converter under the catalytic action of the present high-grade metal, are absorbed in the catalytic converter so as to form nitrates such as for example barium nitrate, and are thereby removed from the exhaust-gas flow. Once the storage capacity of the $NO_x$ storage catalytic converter is saturated, then the engine electronics briefly set a rich, reducing exhaust-gas mixture (rich mode normally for approximately two to ten seconds). As a result of the regular brief "enrichment", the reactions take place in the opposite direction, as a result of which the stored nitrogen oxides are discharged back into the exhaust-gas flow and are reduced to $N_2$ by the reducing components, such as HC—incompletely burned hydrocarbons—or CO, which are present in the rich atmosphere. The catalytic converter is thereby regenerated for the next storage cycle. By means of this approach, it is also possible to minimize the pollutant emissions of fuel-efficient lean-burn engines and to adhere to the legally prescribed emissions limit values. The storage capacity of the nitrogen oxide storage catalytic converter may be monitored by means of a $NO_x$ sensor. The mode of operation of nitrogen oxide storage catalytic converters is described in detail in the SAE document SAE 950809. Corresponding $NO_x$ sensors may be gathered from the document "Autoabgaskatalysoren, Grundlagen-Herstellung-Entwicklung-Recycling-Ökologie" ["Automobile exhaust-gas catalytic converters, fundamentals-production-development-recycling-ecology"], 2005, Expert Verlag, $2^{nd}$ Edition.

Presently available storage catalytic converters can store $NO_x$ advantageously only in a temperature range of 250 to 450° C. The highest storage rates are obtained in a temperature window of 300-400° C. With rising temperature, thermal desorption of the nitrogen oxides sets in. Nitrogen oxide storage catalytic converters are therefore conventionally used in the relatively cool underbody region of motor vehicles with lean-burn engines, since here, the exhaust-gas temperatures in normal operation of the vehicle permit optimum utilization of the nitrogen oxide storage catalytic converter.

The focus of present research is in particular on shortening the cold-start phase, since a significant part of the overall pollutant emissions are emitted within the first three minutes after the engine is started. In said time, the catalytic converter virtually does not function since its operating temperature has not been reached. The cold-start phase may be shortened inter alia by the following measures:

- an injection of air upstream of the catalytic converter during rich operation (generating a flame which heats the catalytic converter),
- an electrically heated catalytic converter,
- late ignition,
- mounting the catalytic converter in as close-coupled a position as possible (for example directly downstream of the exhaust manifold).

Mounting the storage catalytic converter as close as possible to the engine would permit early operation of the catalytic converter after a cold start, but has the disadvantages associated with intense heating of the catalytic converter in said position. Specifically in the case of spark-ignition engines, temperatures of approximately 1000° C. can be reached in the catalytic converter in the close-coupled region during full-load operation. In diesel engines, temperatures of a maximum of 800° C. are conventionally reached, for example during the regeneration of a downstream diesel particle filter. For this reason, a nitrogen oxide storage catalytic converter must be capable of withstanding higher thermal loads than a catalytic converter which is positioned in the underbody region of the vehicle. Modern lean-burn spark-ignition engines have the nitrogen oxide storage catalytic converter positioned in the underbody region (see: C. Schwarz et al., MTZ 05/2007, volume 68, pages 332 et seq.), where said nitrogen oxide storage catalytic converter is loaded with a maximum of 830° C. (see A. Waltner et al., "Die zweite Generation der Benzindirekteinspritzung" ["The second generation of gasoline direct injection"], $15^{th}$ Aachen Colloquium 2006).

For the case of a stoichiometrically operated internal combustion engine, WO9617671 describes an exhaust-gas purification device composed of a close-coupled catalytic converter and an underbody catalytic converter, which permits an improved conversion of all three pollutants, specifically hydrocarbons, carbon monoxide and nitrogen, even during the cold-start phase. The close-coupled catalytic converter is subjected to very high temperatures of up to 1100° C. during normal operation of the internal combustion engine, and must therefore have a particularly temperature-resistant composition. According to WO9617671, the close-coupled catalytic converter contains palladium on an aluminium oxide. To stabilize the aluminium oxide with respect to the high temperatures, the catalytic converter also contains at least one oxide of the earth alkali metals strontium oxide, calcium oxide and barium oxide. Said exhaust-gas purification device is optimized for the purpose of stoichiometrically operated internal combustion engines, but is not suitable for removing nitrogen oxides from the exhaust gas of lean-burn internal combustion engines.

US20060168948 discloses a system for exhaust-gas purification, which system is composed of two $NO_x$ storage catalytic converters which are connected in series. Here, the first catalytic converter should have the smallest possible amount of alkali or earth alkali oxide, or even no alkali or earth alkali oxide, in order to ensure a high desorption rate of the nitrogen oxide during the regeneration at low temperatures. The first catalytic converter likewise has a low susceptibility to sulphur poisoning. A method for desulphurization is likewise disclosed. A special regulating strategy for the catalytic converters is not proposed.

DE19918756 describes an arrangement for the purification of an exhaust gas of an internal combustion engine, in particular of motor vehicles, having a catalytic converter system, which is arranged in an exhaust duct, for reducing the nitrogen oxide ($NO_x$) proportion of the exhaust gas, and a method for operating an arrangement of said type. It is provided that the catalytic converter system comprises, in the flow direction of the exhaust gas, a first $NO_x$ storage catalytic converter and, spaced apart from the latter, a second $NO_x$ storage catalytic converter. A close-coupled arrangement of the $NO_x$ storage catalytic converter is not desired. The regulation of the commencement of regeneration of the two nitrogen oxide storage catalytic converters takes place as a function of temperature or as a function of the storage degree of the catalytic converter, wherein no statement is made regarding the termination of the rich mode.

EP1152140 describes an exhaust-gas purification device in which use is made of two separate $NO_x$ storage catalytic converters. Here, the first catalytic converter is situated in relation to the second catalytic converter in a region of the exhaust system in which higher temperatures prevail. Here, the alkalinity of the first catalytic converter is increased in relation to that of the second catalytic converter which is situated downstream, such that an improved $NO_x$ storage activity can be obtained even at high temperatures. A three-way catalytic converter (TWC) may be situated upstream of the close-coupled $NO_x$ storage catalytic converter, if appropriate canned together with the $NO_x$ storage catalytic converter. Said document does not make any mention of a regeneration strategy.

In contrast, WO2006069652 proposes a method for monitoring the nitrogen oxide storage capacity of a nitrogen oxide storage catalytic converter system which is composed of a close-coupled starting catalytic converter and a main catalytic converter, with both catalytic converters being embodied as nitrogen oxide storage catalytic converters. In a catalytic converter system of said type, the starting catalytic converter is of course exposed to particularly high temperatures during operation, and is therefore subjected to fast ageing. The nitrogen oxide storage capacity of said starting catalytic converter therefore decreases more quickly than that of the main catalytic converter. It is therefore necessary to test the ageing state of the starting catalytic converter more frequently in order to be able to detect a malfunction of the catalytic converter in good time. According to the embodiment of said invention, the starting catalytic converter should additionally have an oxygen storage function. In normal operation, the catalytic converter is regenerated from time to time by briefly switching the engine from lean-burn operation to rich operation if the evaluation of the leakage of nitrogen oxide downstream of the catalytic converter exceeds a regeneration criterion, in order to desorb again the nitrogen oxides which have been stored during lean running of the engine, and to convert said nitrogen oxides to harmless components. The nitrogen oxide sensor downstream of the main catalytic converter serves to determine the switching point. As a criterion for the switching from the lean-burn mode into rich operation, it is possible to take into consideration the nitrogen oxide concentration in the exhaust gas as measured by the nitrogen oxide sensor. If said nitrogen oxide concentration exceeds a predefined limit value, the regeneration is commenced.

It is to be assumed that the exhaust gas of modern lean-burn engines will become ever cooler in future. The reasons for this are the ever more efficient combustion processes of modern engines and the aim to further reduce the $CO_2$ emissions and therefore fuel consumption. In addition, further heat sinks are introduced into the exhaust system by measures such as turbocharging. The literature (see: C. Schwarz et al., MTZ 05/2007, volume 68, pages 332 et seq., and A. Waltner et al., "Die zweite Generation der Benzindirekteinspritzung" ["The second generation of gasoline direct injection"], 15th Aachen Colloquium 2006) describes that, even in vehicles already in series production with second-generation spark-ignition engines with gasoline direct injection and stratified charging, very low exhaust-gas temperatures prevail in the underbody catalytic converter during the driving cycle, such that heating measures must bring the catalytic converter up to operating temperature, which can increase the fuel consumption. In the temperature profiles of a close-coupled three-way catalytic converter and of a nitrogen oxide storage catalytic converter, which is arranged in the underbody region, over the "New European Driving Cycle (NEDC)" as depicted in the above-cited literature, it can be seen that the close-coupled three-way catalytic converter is operated at a temperature which is approximately 50-200° C. warmer than the catalytic converter which is arranged in the underbody region. Furthermore, the close-coupled catalytic converter reaches the operating temperature of over 250° C. significantly more quickly than the catalytic converter which is arranged in the underbody region. This fact suggests the conclusion that the nitrogen oxide storage catalytic converter should be close-coupled. Since the operating temperature of the close-coupled catalytic converter often lies above the optimum operating temperature of the nitrogen oxide storage catalytic converter, it is necessary to arrange a further nitrogen oxide storage catalytic converter in the underbody region. Furthermore, the installation space in the close-coupled position is conventionally severely restricted, such that a single close-coupled nitrogen oxide storage catalytic converter cannot be of sufficiently large dimensions.

It is a fact that there have hitherto been no ecologically and economically advantageous solutions in the prior art for how an exhaust-gas purification system, preferably with a close-coupled nitrogen oxide storage catalytic converter and further nitrogen oxide storage catalytic converters attached possibly in the underbody region, may be operated expediently in order to meet the requirements of a cold exhaust gas or the cold-start problem, and to give consideration to the overall pollutant emissions and the thermal loading.

It was therefore an object of the present invention to design a regulating strategy with which an exhaust-gas purification system having at least two nitrogen oxide storage catalytic converters can be operated expediently. Here, the regulating strategy should make it possible generally for systems having a preferably close-coupled nitrogen oxide storage catalytic converter and having one or more nitrogen oxide storage catalytic converters installed possibly in the underbody region to be operated advantageously from an economical and ecological aspect, and to simultaneously meet the demands of the ever-increasing exhaust-gas limit values.

Said object, and further objects which are not stated in any more detail but which can be gathered in an obvious way from the prior art, are successfully achieved by means of a method described using the features of the objective Claim 1. Preferred refinements of the method according to the invention can be found in the subclaims which are dependent on Claim 1.

Since, in a method for the treatment of exhaust gases of a predominantly lean-operated internal combustion engine, having an exhaust-gas purification device which has a preferably close-coupled first nitrogen oxide storage catalytic converter, and downstream thereof in the same exhaust section one or more further nitrogen oxide storage catalytic converters which are in each case arranged spatially separate from one another, a) the initiation of the rich phase for the regeneration of the nitrogen oxide storage catalytic converters takes place by attaining predefined nitrogen oxide threshold values downstream of the individual catalytic converters, and b) the termination of the rich phase for the regeneration of the nitrogen oxide storage catalytic converters is commenced when a certain lambda value is undershot downstream of the catalytic converter downstream of which the present rich phase was initiated as a result of the predefined nitrogen oxide threshold values being attained, c) with the respective predefined nitrogen oxide threshold values being selected to be progressively lower in the flow direction, and d) with a catalytic converter being considered to be a nitrogen oxide storage catalytic converter only where it attains a predefined level of nitrogen oxide storage activity under the present conditions after the regeneration, the described objects are achieved in a very simple yet advantageous and unexpected manner. In particular, it is possible by means of said device and the operation thereof according to the invention to achieve a considerable reduction in pollutant emissions both in the cold phases of the operating range of a motor vehicle (traffic congestion, city driving, starting phase) and also in operating ranges at high temperatures with predominantly lean exhaust gas. The regulating strategy according to the invention also makes it possible to react in a flexible manner to changing operating states of the engine, and to nevertheless ensure with sufficient certainty that the nitrogen oxide exhaust-gas limit values are adhered to.

The nitrogen oxide storage catalytic converters to be used here are sufficiently well known to a person skilled in the art. A nitrogen oxide storage catalytic converter generally comprises the actual catalytically active components (for example Pd, Pt, Rh), the storage material (for example BaO) and a support (for example aluminium oxide, $CeO_2$) [EP-A-1 317 953, WO 2005/092481]. The materials are applied, together or separately from one another, and using the methods known to a person skilled in the art, in the form of a coating to monolithic, inert tetragonal or hexagonal honeycomb bodies composed of ceramic (for example cordierite) or metal. The honeycomb bodies have, arranged in a fine grid pattern over their cross section, flow ducts, which lie parallel to the longitudinal axis of the honeycomb body, for the exhaust gas which is to be purified. The cell density (number of flow ducts per unit of cross-sectional area of the honeycomb bodies) is usually between 1800 and 100 cpsi, preferably 900-300 cpsi, particularly preferably approximately 400 cpsi. Nowadays, use is made most frequently of honeycomb bodies with cell densities of 62 $cm^{-2}$. The catalytically active coating is deposited on the wall surfaces of the partitions, which delimit the flow ducts, in concentrations of 50 to 450 grams per liter (g/l) volume of the honeycomb bodies, preferably between 200-400 g/l and very particularly preferably 250-350 g/l.

The nitrogen oxide storage catalytic converters should be fitted spatially separately from one another. Within the context of the invention, spatially separate means that a certain region which does not have a nitrogen oxide storage catalytic converter is situated between the individual nitrogen oxide storage catalytic converters, and said nitrogen oxide storage catalytic converters are therefore spaced apart from one another. Nitrogen oxide storage catalytic converters which are not formed as two individual nitrogen oxide storage catalytic converters are therefore considered to be those which are arranged in direct succession in one converter housing. A spacing between the individual nitrogen oxide storage catalytic converters in a range of 20 to 200 cm, preferably 40 to 150 cm and very preferably 60 to 120 cm is considered to be sufficient and advantageous.

Possible catalytic converter arrangements according to the invention are shown by way of example in FIGS. 1-5.

The initiation of the rich phase takes place when predefined nitrogen oxide threshold values downstream of the individual catalytic converters are attained. Said value is for example attained when, for whatever reason, the nitrogen oxide storage activity of a nitrogen oxide storage catalytic converter decreases and increased leakage of nitrogen oxide occurs.

A nitrogen oxide threshold value, which, within the context of the invention, controls the commencement of the rich mode, is to be understood to mean the level of a nitrogen oxide emission [mass]. A person skilled in the art may define the parameters which are used as a basis for the determination or calculation of said emissions threshold values or limit values. As parameters which are preferably used for this purpose, it is possible to take into consideration the following variables selected from the group containing nitrogen oxide mass flow, nitrogen oxide concentration, cumulative nitrogen oxide mass flow, relative nitrogen oxide concentration, relative cumulative nitrogen oxide mass flow, relative nitrogen oxide mass flow, etc. For example, the (possibly cumulative) nitrogen oxide concentration may be measured directly by a nitrogen oxide sensor downstream of each individual nitrogen oxide storage catalytic converter, or may be modelled by means of nitrogen oxide emissions characteristic maps in an electronic control unit. Said control unit may likewise calculate the nitrogen oxide mass flows from the modelled concentrations.

When using a nitrogen oxide sensor, the nitrogen oxide concentration is the direct measurement variable; the nitrogen oxide mass flow can be calculated in a simple manner by multiplication with the exhaust-gas mass flow and the density ratio of nitrogen oxide to exhaust gas. Adding up the product of present nitrogen oxide mass flow and present sampling rate provides the cumulative nitrogen oxide mass flow. If one of the above values is related to a further value, a relative value is obtained. Relating to the distance travelled during the adding-up period provides a nitrogen oxide value in grams per kilometer (g/km), and relating the cumulative nitrogen oxide mass flow to the cumulative nitrogen oxide mass flow upstream of the nitrogen oxide storage catalytic converter provides a nitrogen oxide value as a conversion in grams per gram. The nitrogen oxide threshold values may be determined correspondingly on the basis of said variable.

It is additionally possible for the temperatures downstream of the individual nitrogen oxide storage catalytic converters to be measured or modelled and taken into consideration for the commencement of the rich mode. It may for example likewise be expedient to commence a regeneration (see further below) before a certain limit temperature is exceeded at which the respective nitrogen oxide storage catalytic converter has an increased desorption speed for nitrogen oxides, which is conventionally the case at temperatures of over 500° C.

Figure 9:
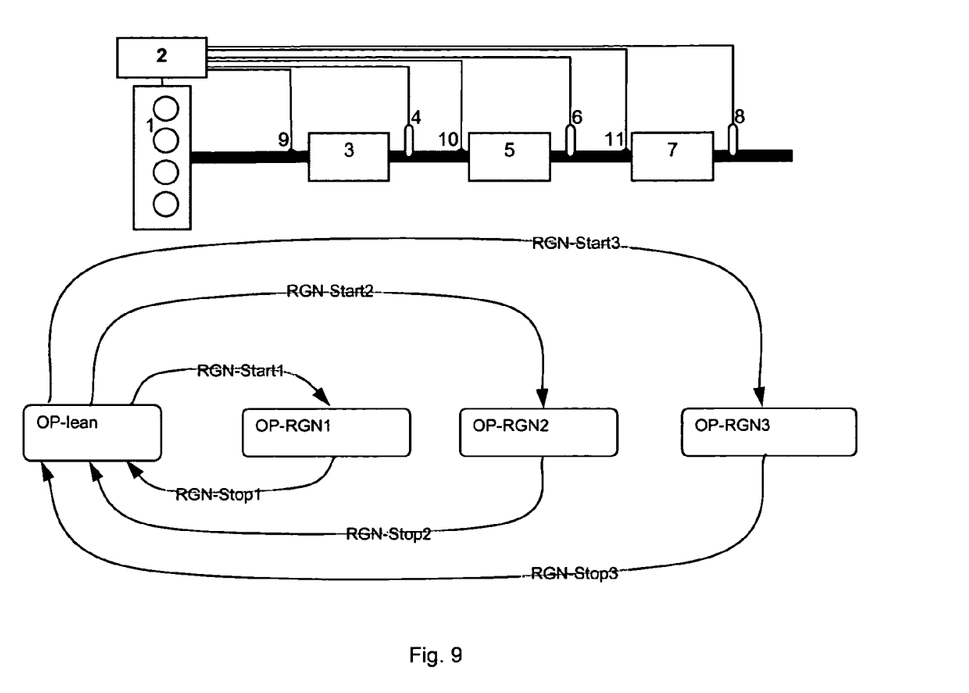
FIG. 9 shows a possible regulating regime according to the invention for a catalytic converter system for the purification of the exhaust gas of a lean-burn engine (1), composed of the nitrogen oxide storage catalytic converters (3, 5 and 7) with their in each case leading temperature sensors (9, 10 and 11) and following gas sensor (4, 6 and 8), with the sensors transmitting their signals to the engine controller (2) which in turn controls the operation of the lean-burn engine (1). The engine controller (2) has stored in it the following regulating strategy.

As already indicated, in the proposed exhaust-gas aftertreatment system, it is essentially possible in the lean phase, depending on the design of the storage material of the individual nitrogen oxide storage catalytic converter, on the loading state thereof, on the degree of ageing thereof, on the poisoning thereof with sulphur, on the operating temperature thereof and/or on the mass flow of nitrogen oxides, for breakthroughs of nitrogen oxides through the catalytic converter material to occur shortly before the storage activity is exhausted. To be able to also reliably prevent such operating states, in the present method, the storage of the nitrogen oxides takes place sequentially in nitrogen oxide storage catalytic converters which are situated in series and which are spaced apart from one another (FIG. 9). Here, the initiation of the regeneration of the individual catalytic converters takes place as a result of the exceedance of nitrogen oxide threshold values downstream of the individual catalytic converters (see above). Within the context of the invention, said threshold values may be adapted flexibly by the engine controller to the respective operating states of the engine and catalytic converter designs. It is a condition that the respective predefined nitrogen oxide threshold values are selected to be progressively lower in the flow direction. The exceedance of the threshold values accordingly serves as a regulating criterion for initiating the regeneration ("rich phase"). Said regulating criterion may occur downstream of each of the catalytic converters which are used, such that the threshold values define a type of characteristic curve along the catalytic converter arrangements. Said characteristic curve may be of linear form, of hyperbolic form, of negative sigmoidal form, of negative exponential form, in the form of $1/x$ or of reciprocally logarithmic form. It is advantageous if adjacent threshold values are used which differ by the factor 1.02 to 50, preferably 1.05 to 30, particularly preferably 1.2 to 20 and very particularly preferably 1.5 to 15. It is particularly advantageous if the system sets itself up in this regard such that, with the present catalytic converter setup and the actual prevailing conditions, an optimum is obtained from an ecological and economical aspect with regard to the end result to be achieved (adhering to the exhaust-gas limit values with the lowest possible fuel consumption).

The termination of the regeneration phase takes place when a certain lambda value is undershot downstream of the catalytic converter downstream of which the present rich phase was initiated as a result of the predefined nitrogen oxide threshold values being attained. The configuration of said termination may be determined by a person skilled in the art on the basis of his general expert knowledge, or by the engine controller within the context of the optimization of the proposed exhaust-gas aftertreatment system (adhering to the exhaust-gas limit values with the lowest possible fuel consumption).

As already described in the introduction, the Lambda value is a measure of the ratio of oxygen to reducing components in the exhaust gas, in particular in the HC and CO proportion. The lambda value is preferably assumed to be between 1.1 and 0.8, more preferably a value between 1.05 and 0.9, and very particularly preferably a value around 1. If the limit values proposed here with regard to the air/fuel ratio downstream of the catalytic converter downstream of which the present rich phase was initiated as a result of the predefined nitrogen oxide threshold values being attained, the termination of the rich phase for the regeneration of the nitrogen oxide storage catalytic converters is commenced and the engine is therefore re-set to normal lean-burn operation.

The nitrogen oxide storage activity of a catalytic converter which is used should, within the context of the embodiment of the invention, have a predefined value again after the regeneration. This is because, within the context of the invention, a catalytic converter is considered to be a nitrogen oxide storage catalytic converter only where it attains a predefined level of nitrogen oxide storage activity under the present conditions after the regeneration. This is dependent on several influential parameters. The limit should be selected where an optimum is obtained from an ecological and economical aspect with regard to the end result to be achieved (adhering to the exhaust-gas limit values with the lowest possible fuel consumption). Parameters which in particular reduce the nitrogen oxide storage activity include effects selected from the group consisting of excessively high temperature, thermal ageing (FIG. 8), poisoning for example by means of sulphur or other poisonous elements, or combinations thereof. A catalytic converter which does not attain or have the predefined value after the regeneration then no longer participates in the described regulating circuit, since said catalytic converter is considered not to be present with regard to the initiation of the rich phase and also the termination thereof.

A predefined nitrogen oxide storage activity is to be understood to mean a value at which the operation of the respective nitrogen oxide storage catalytic converter by changing between lean and rich is still expedient with regard to the object to be achieved. If the nitrogen oxide storage activity is too low, then it would be possible to measure a high level of leakage of nitrogen oxide downstream of the catalytic converter immediately after the regeneration, which would start a new regeneration and which would therefore increase the fuel consumption without the storage activity of the downstream catalytic converters being utilized. The nitrogen oxide storage activity may be reversibly or irreversibly reduced. Severe thermal ageing or poisoning of the catalytic converter by means of inorganic poisonous elements from the oil ash or inorganic fuel constituents leads to an irreversible reduction in the nitrogen oxide storage activity. By definition, a nitrogen oxide storage catalytic converter which has been irreversibly severely deactivated will no longer participate in the regulating circuit. However, if the reduction in the nitrogen oxide storage activity is reversible, for example if the nitrogen oxide storage catalytic converter is operated outside its optimum temperature window for nitrogen oxide storage or if the catalytic converter has been reversibly poisoned by sulphur, then the nitrogen oxide storage catalytic converter is incorporated back into the regulating circuit again after the restoration of the respective nitrogen oxide storage activity.

For explanation of the aspect discussed immediately above, it is pointed out that for example the close-coupled first storage catalytic converter can store no nitrogen oxides, or at least few nitrogen oxides, when heated to over 550° C. Here, a regeneration of said catalytic converter does not lead to the attainment of a sufficient value for the storage activity. In said case, within the context of the invention and with regard to the regulating strategy, the catalytic converter which follows said storage catalytic converter is regarded as the first nitrogen oxide storage catalytic converter. Said nitrogen oxide storage catalytic converter is then of course no longer the catalytic converter which is closest to the engine. If the criterion for the initiation of the regeneration is then attained downstream of said nitrogen oxide storage catalytic converter, a regeneration takes place across said nitrogen oxide storage catalytic converter and across the preceding catalytic converter. A corresponding situation also applies to the catalytic converter or catalytic converters downstream of said nitrogen oxide storage catalytic converter.

As stated, a basic prerequisite in the method according to the invention is however that the discussed characteristic curve for the nitrogen oxide threshold values is configured such that said nitrogen oxide threshold values are selected to be progressively lower in the flow direction. Said nitrogen oxide threshold values are specified such that the nitrogen oxide threshold value downstream of the final catalytic converter lies below the relevant legal limit in the majority of operating states of the engine. It is particularly advantageous if the characteristic curve is configured such that the nitrogen oxide threshold value downstream of the final catalytic converter lies below the relevant legal limit in the test cycles predefined by the relevant regulations (NEDC, FTP-75, US06, 10-15 Mode Test, etc.). It is particularly preferable for the nitrogen oxide threshold values downstream of the final catalytic converter to always lie below the relevant legal limit.

Said advantageous embodiment which is discussed immediately above may also be assisted in that further storage catalytic converters, in particular more than two nitrogen oxide storage catalytic converters, are arranged in the exhaust section. This accordingly means that the number of nitrogen oxide storage catalytic converters is selected such that the nitrogen oxide threshold value downstream of the final catalytic converter lies below the relevant legal limit in the majority of operating states of the engine. It is particularly advantageous if the number of catalytic converters present is selected such that the nitrogen oxide threshold value downstream of the final catalytic converter lies below the relevant legal limit in the driving cycles (see above) predefined by the relevant regulations. It is particularly preferable for the nitrogen oxide threshold values downstream of the final catalytic converter to always lie below the relevant legal limit.

There is a reciprocal relationship between the two points stated immediately above—the configuration of the characteristic curve and the number of nitrogen oxide storage catalytic converters and the nitrogen oxide storage material. It is clear to a person skilled in the art that he should set the parameters of the system such that the optimum result is obtained from an ecological and economical aspect (adhering to the exhaust-gas limit values with the lowest possible fuel consumption).

Figure 8:
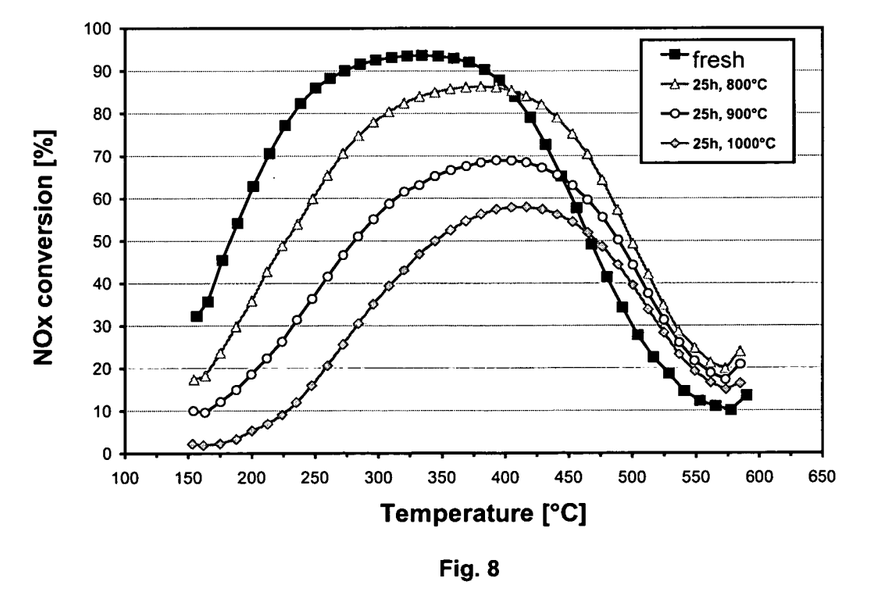
FIG. 8 shows model gas results of the nitrogen oxide ($NO_x$) conversion against the inlet temperature of a nitrogen oxide storage catalytic converter in the fresh state and after 25 hours of ageing at 800, 900 and 1000° C. in a hydrothermal atmosphere (10% oxygen, 10% water vapour, 80% nitrogen).

In principle, the method according to the invention may be carried out with at least two nitrogen oxide storage catalytic converters. As described, it is however also expedient to accommodate preferably three or four or more nitrogen oxide storage catalytic converters in series in the exhaust section of the vehicle for better control of the pollutants generated during the combustion of the exhaust gas. Specifically, under some circumstances, two nitrogen oxide storage catalytic converters are not sufficient for optimum purification of the exhaust gases. Firstly, in the method according to the invention, a preferred embodiment is that the first nitrogen oxide storage catalytic converter is close-coupled. As already indicated in the introduction, said first nitrogen oxide storage catalytic converter is therefore exposed, under some circumstances, to very high temperatures. The temperatures may lie far above the limit from which a desorption of nitrogen dioxides from the storage material is preferable. The nitrogen oxide storage activity of said close-coupled catalytic converter can also be permanently impaired on account of thermal loading (FIG. 8). Secondly, it may be the case that a deactivation of the catalytic converter occurs on account of "poisoning" with sulphur oxides (for example US 20060168948). In such cases, the presence of more than two separate (spatially separate) nitrogen oxide storage catalytic converters is definitely advantageous.

Figure 1:
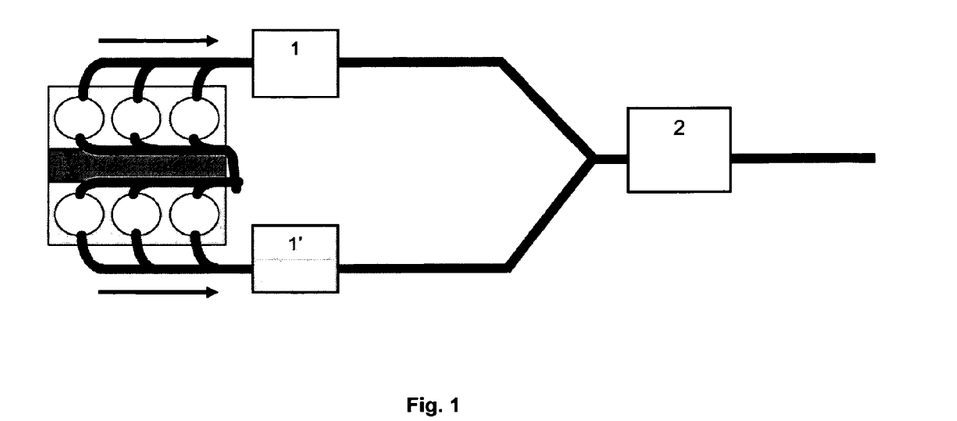
FIG. 1 shows a possible arrangement according to the invention of the close-coupled nitrogen oxide storage catalytic converters (1 and 1') and of the nitrogen oxide storage catalytic converters (2), which are arranged in the underbody region, in the exhaust section.
Figure 2:
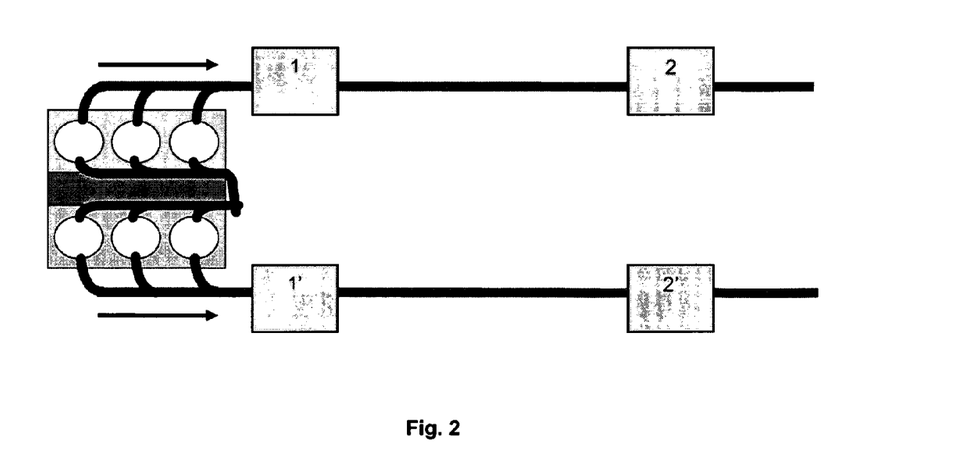
FIG. 2 shows a possible arrangement according to the invention of the close-coupled nitrogen oxide storage catalytic converters (1 and 1') and of the nitrogen oxide storage catalytic converters (2 and 2'), which are arranged in the underbody region, in the exhaust section.
Figure 3:
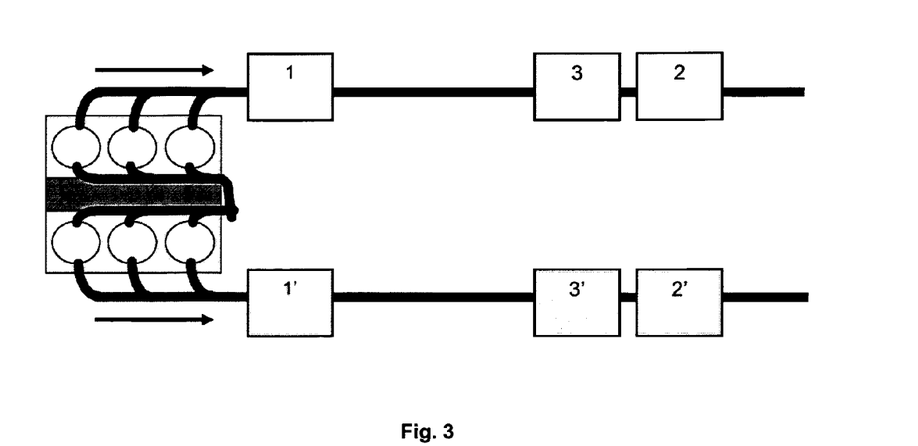
FIG. 3 shows a possible arrangement according to the invention of the close-coupled nitrogen oxide storage catalytic converters (1 and 1') and of the nitrogen oxide storage catalytic converters (2 and 2'), which are arranged in the underbody region, and of the SCR catalytic converters (3 and 3'), which are situated between the close-coupled and underbody nitrogen oxide storage catalytic converters, in the exhaust section.
Figure 4:
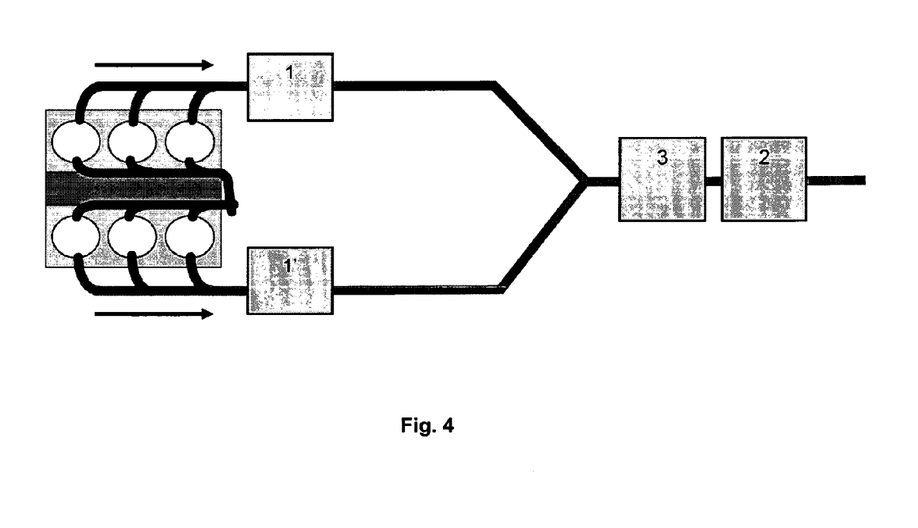
FIG. 4 shows a possible arrangement according to the invention of the close-coupled nitrogen oxide storage catalytic converters (1 and 1') and of the nitrogen oxide storage catalytic converters (2), which are arranged in the underbody region, and of the SCR catalytic converters (3), which are situated between the close-coupled and underbody nitrogen oxide storage catalytic converters, in the exhaust section.
Figure 5:
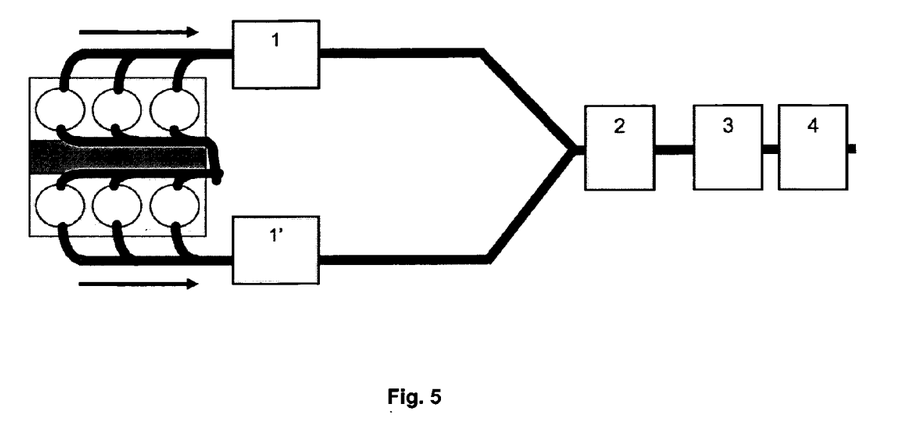
FIG. 5 shows a possible arrangement according to the invention of the close-coupled nitrogen oxide storage catalytic converters (1 and 1') and of the nitrogen oxide storage catalytic converter (2), which is arranged in the underbody region, with a downstream SCR catalytic converter (3) and a further nitrogen oxide storage catalytic converter (4), in the exhaust section.

In a further preferred embodiment, an SCR catalytic converter may be situated downstream of the individual spatially separate nitrogen oxide storage catalytic converters (FIGS. 3 and 4). SCR catalytic converters of said type are well known to a person skilled in the art (WO2007/137675, U.S. Pat. No. 4,961,917, DE10335785). SCR catalytic converters are to be understood to mean catalytic converters which, under lean exhaust-gas conditions, and with the addition of reducing agent, such as for example ammonia, selectively convert nitrogen oxides to form nitrogen. Said catalytic converters contain acidic oxides and may store ammonia. Typical SCR catalytic converters contain, for example, vanadium oxide and/or tungsten oxide on titanium oxide. Alternatively, it is also possible to use zeolites which are used as an H-shape or which may be exchanged with metals such as copper and/or iron. Catalytic converters of said type usually do not contain any catalytically active platinum metals, since said metals would oxidize the ammonia in the lean exhaust gas to form nitrogen oxides. For the exhaust-gas purification system according to the invention, use is preferably made of SCR catalytic converters which contain zeolites. Zeolites have a particularly large storage capacity for ammonia and for hydrocarbons. They are therefore extremely well suited to storing and converting said components of the exhaust gas with nitrogen oxides.

In a very particularly preferred embodiment, the termination of the "rich phase" in a case such as that described immediately above is modified in such a way that the termination of the rich phase for the regeneration of the nitrogen oxide storage catalytic converters is initiated only when a (certain) lambda value as specified further above is undershot downstream of the respective SCR catalytic converter. In this way, it is obtained firstly that the ammonia which is formed during the rich phase across the close-coupled nitrogen oxide storage catalytic converter is stored in the correspondingly designed SCR catalytic converter, and in the subsequent lean phase can be used for the selective reduction of nitrogen oxides across the SCR catalytic converter. Furthermore, it is prevented in this way that the ammonia which is formed is oxidized back into nitrogen oxides, and stored, by the subsequent nitrogen oxide storage catalytic converter downstream, which would reduce the storage capacity of the further nitrogen oxide storage catalytic converters, which are possibly situated in the underbody region, more quickly. It is advantageous for the SCR catalytic converter to likewise be positioned in the underbody region, since the ammonia storage capacity of said SCR catalytic converter at low temperatures (<350° C.) is greater than at high temperatures, and the maximum thermal loading in said range is likewise lower.

It is likewise expedient for SCR catalytic converters to be arranged downstream of one or more of the further nitrogen oxide storage catalytic converters which are possibly installed in the underbody region, since the thermal loading is even lower there and a direct emission of ammonia into the atmosphere is prevented by means of said arrangement. Here, however, the quantities of ammonia which are formed are significantly lower than in the case of the SCR catalytic converter being positioned upstream of the further nitrogen oxide storage catalytic converters, which are possibly situated in the underbody region, as a result of which the contribution of said quantities of ammonia to the overall conversion of the nitrogen oxides in said arrangement.

Fuels which are sold nowadays are not completely free from sulphur. Vehicles with a nitrogen oxide storage catalytic converter must be operated with a fuel with a sulphur content of less than 10 ppm. This is because sulphur dioxides, which are discharged from the engine with the exhaust gas, are generated during the combustion of said fuel even in lean-burn operation. It is in their nature that advantageous nitrogen oxide storage catalytic converters are also excellent at storing sulphur oxide, in particular $SO_2$ and $SO_3$. Depending on the sulphur content of the fuel, it is therefore necessary for the nitrogen oxide storage catalytic converters to be freed not only of nitrogen oxide but rather also of the stored sulphur oxide (US20060168948). An undesired accumulation of the sulphur otherwise occurs in the storage catalytic converter, resulting in poisoning of the storage material as a result of a build-up of sulphate. However, on account of the greater affinity of the storage material to sulphur oxides, the regeneration takes place at higher temperatures than for nitrogen oxide. To release the sulphur and convert it back to sulphur dioxide ($SO_2$), the exhaust-gas temperature must therefore be correspondingly increased. The close-coupled nitrogen oxide storage catalytic converter has the advantage that it can serve as a sulphur trap and, as a result of being close-coupled, is heated to corresponding temperatures on a sufficiently frequent basis. It is therefore advantageous if the desulphurization is initiated if the temperature of the close-coupled nitrogen oxide storage catalytic converter is >600° C., preferably greater than 650° C. and particularly preferably greater than 700° C. The desulphurization may in principle be obtained by means of the same mechanism as the nitrogen oxide storage catalytic converter, by means of "enrichment". The above-specified measures may therefore be used here with regard to the specified temperatures, taking into consideration here that a desulphurization takes longer in terms of time than the regeneration of nitrogen oxides.

In a further preferred embodiment, in such a regeneration of the close-coupled nitrogen oxide storage catalytic converter, the sulphur-containing exhaust gas which is generated is conducted past one or more downstream nitrogen oxide storage catalytic converter(s) by means of a bypass line, such that said nitrogen oxide storage catalytic converter(s) are not additionally loaded with sulphur oxides. From time to time, however, said nitrogen oxide storage catalytic converters must also be freed of sulphur. This preferably takes place in connection with the desulphurization of a part of the system or of the entire system. This is advantageously initiated if the temperature of the downstream nitrogen oxide storage catalytic converter, which is possibly installed in the underbody region, is >550° C., more preferably greater than 600° C. and very particularly preferably greater than 650° C.

A person skilled in the art knows which engine controller can be used here in order to be able to carry out the regulating strategy according to the invention for the exhaust-gas purification system (Electronic Engine Controls, 2008, ISBN Number: 978-0-7680-2001-4). Said person skilled in the art is likewise familiar with sensors which may be taken into consideration for measuring the regeneration criteria ($NO_x$ threshold value and lambda value) (Christian Hagelüken, "Autoabgaskatalysoren, Grundlagen-Herstellung-Entwicklung-Recycling-Ökologie" ["Automobile exhaust-gas catalytic converters, fundamentals-production-development-recycling-ecology"], Expert Verlag, $2^{nd}$ Edition, pages 188 et seq., in particular page 206 et seq.).

However, it should be noted that in one particularly advantageous embodiment it is also possible to dispense with the attachment of sensors downstream of the nitrogen oxide storage catalytic converter or SCR catalytic converter. Here, the respective regeneration criteria (nitrogen oxide threshold value and rich breakthrough) are obtained on the basis of the data of the engine characteristic and by computer calculation. Dispensing with sensors is particularly advantageous with regard to costs and servicing of a system of said type.

The present invention is delimited with respect to the prior art by its special type of regeneration of the individual nitrogen oxide storage catalytic converters which are arranged in the exhaust section of a lean-burn internal combustion engine.

In contrast, WO200669652 describes that a regeneration of the overall system is normally carried out, with the nitrogen oxide concentration in the exhaust gas downstream of the main catalytic converter being taken into consideration as a criterion for the switch from the lean mode into the rich mode. To be able to determine the storage capacity of the close-coupled nitrogen oxide storage catalytic converter, said storage capacity is determined separately from that of the main catalytic converter. According to the invention, for this purpose, the entire catalytic converter system is loaded with nitrogen oxides, as in the other lean-running phases, until the regeneration criterion is reached. Instead of a total regeneration, however, only a partial regeneration is then carried out, which consists of a regeneration of the starting catalytic converter, with the time for the regeneration of the starting catalytic converter being taken into consideration as a measure for its remaining nitrogen oxide storage capacity. The present invention is advantageously delimited from this in that a regeneration takes place at all times across the close-coupled nitrogen oxide storage catalytic converter in particular once the storage capacity of said nitrogen oxide storage catalytic converter has been exhausted, that is to say once the nitrogen oxide threshold value has been exceeded for sufficient nitrogen oxide storage activity. The regeneration across the respective downstream nitrogen oxide storage catalytic converter takes place only if in particular the storage capacity of said downstream nitrogen oxide storage catalytic converter has been exhausted, for example if the upstream nitrogen oxide storage catalytic converters fall below a certain value in terms of their actual activity—for example for the reasons stated in the introduction.

By way of example, for a system composed of a close-coupled nitrogen oxide storage catalytic converter and an underbody nitrogen oxide storage catalytic converter, this means that, in ranges in which the close-coupled nitrogen oxide storage catalytic converter has a sufficient level of activity, the engine controller switches the engine from lean operation to rich operation (see above) once a regeneration criterion (nitrogen oxide threshold value) downstream of the close-coupled nitrogen oxide storage catalytic converter is exceeded. The rich mode is then deactivated again once a rich breakthrough is detected downstream of the close-coupled nitrogen oxide storage catalytic converter. The regenerated close-coupled nitrogen oxide storage catalytic converter is now ready to store nitrogen oxides again. If the close-coupled nitrogen oxide storage catalytic converter then has, on account of an excessively high temperature, a level of activity which is too low, the further nitrogen oxide storage catalytic converter, which is possibly installed in the underbody, then experiences correspondingly high levels of activity. The regulation of the regeneration of the exhaust-gas purification system possibly takes place exclusively across the underbody nitrogen oxide storage catalytic converter. Once the regeneration criterion (nitrogen oxide threshold value) is met downstream of the underbody nitrogen oxide storage catalytic converter, the engine electronics triggers a switch to rich operation. This is maintained until a certain lambda value is undershot downstream of the underbody nitrogen oxide storage catalytic converter. The engine is then operated in the normal lean mode again until the regeneration criterion occurs again downstream of the underbody nitrogen oxide storage catalytic converter or the regeneration criterion is reached downstream of the close-coupled nitrogen oxide storage catalytic converter if sufficient activity of the latter is available again. This should be understood correspondingly for three or more nitrogen oxide storage catalytic converters which are arranged spatially separate from one another.

Said operating mode results overall in reduced reducing agent breakthroughs at the end of the overall exhaust system, since the downstream nitrogen oxide storage catalytic converters, if present, can easily oxidize the small reducing agent breakthrough, which occurs up until the end of the rich phase, across the nitrogen oxide storage catalytic converter which initiates the rich phase. Similar behaviour is obtained with the leakage of $NH_3$, which is possibly formed during the rich phase, at the end of the rich phase by means of the nitrogen oxide storage catalytic converter which initiates the rich phase. $NH_3$ which is formed across the nitrogen oxide storage catalytic converter which initiates the rich phase is oxidized on the further nitrogen oxide storage catalytic converters to form nitrogen dioxide, and is then directly stored again, such that it cannot pass into the atmosphere. Furthermore, during the regeneration of the close-coupled nitrogen oxide storage catalytic converter, the nitrogen oxide desorption peaks which generally occur at the start of the regeneration process are intercepted by the further nitrogen oxide storage catalytic converters and are not emitted, as is otherwise conventional; this further reduces the nitrogen oxide emissions.

Despite the more frequent regenerations overall in the regeneration strategy proposed in this invention, the fuel consumption should differ in a positive way from the otherwise conventional regeneration strategy, since the regenerations are on average significantly shorter than the otherwise conventional regeneration across the overall exhaust system. In the latter case, in addition to the stored nitrogen oxides, oxygen stores which are possibly present in the overall exhaust system (including, for example, in a three-way catalytic converter) are reduced, while in the present case, it is only ever the oxygen stores up to the respective nitrogen oxide storage catalytic converter which initiates the rich phase which are reduced.

Figure 6:
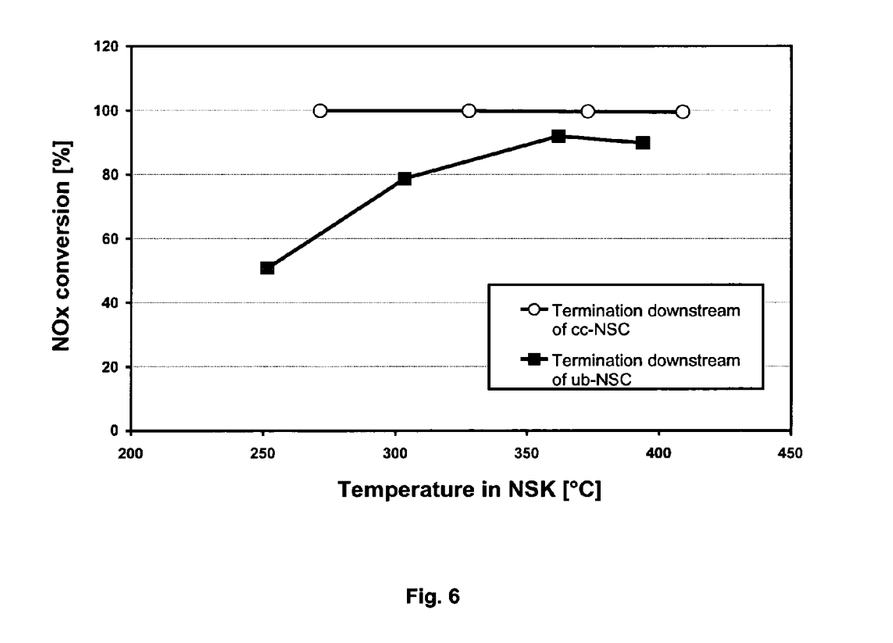
FIG. 6 shows a plot of the $NO_x$ conversion against the temperature in the close-coupled nitrogen oxide storage catalytic converter during a regeneration only across the close-coupled nitrogen oxide storage catalytic converter (cc-NSC) and a regeneration across the underbody nitrogen oxide storage catalytic converter (ub-NSC).
Figure 7:
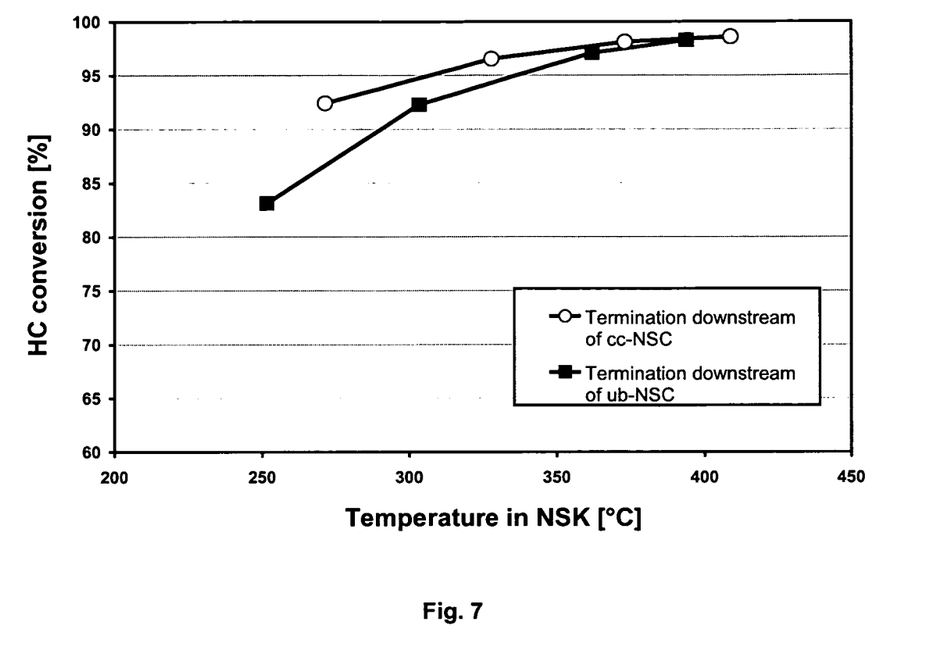
FIG. 7 shows a plot of the hydrocarbon (HC) conversion against the temperature in the close-coupled nitrogen oxide storage catalytic converter during a regeneration only across the close-coupled nitrogen oxide storage catalytic converter (cc-NSC) and a regeneration across the underbody nitrogen oxide storage catalytic converter (ub-NSC).

A nitrogen oxide storage catalytic converter which is arranged in the underbody region is generally optimally utilized at vehicle speeds of 50-100 km/h, where temperatures of 250-450° C. generally prevail in the catalytic converter. At relatively low exhaust-gas temperatures, for example at vehicle speeds of below 50 km/h or during a cold start, it is advantageous for a further nitrogen oxide storage catalytic converter to be close-coupled, which further nitrogen oxide storage catalytic converter is exposed to higher temperatures on average and can therefore provide its optimum contribution to the reduction of $NO_x$ at the relatively cold operating points of the engine (FIGS. 6 and 7). It is particularly advantageous for a further nitrogen oxide storage catalytic converter to be situated downstream of the nitrogen oxide storage catalytic converter which is situated in the underbody, for example in the position of the exhaust muffler, inter alia when a high $NO_x$ conversion rate is required even at high exhaust-gas temperatures. This would be the case for example at vehicle speeds of over approximately 100 km/h. In this case, the temperature of the nitrogen oxide storage catalytic converter which is situated in the underbody region would probably also be too high, as a result of which the nitrogen oxide storage catalytic converter situated even further rearward would then be used. This could not be derived in an obvious way from the prior art.

Where the text refers to the underbody region, this relates, in connection with the present invention, to a region in the vehicle in which the catalytic converter is fitted at a distance of 0.2-2.5 m, more preferably 0.5-2 m and very particularly preferably 0.7-1.5 m downstream of the end of the first close-coupled catalytic converter.

Within the context of this invention, close-coupled refers to an arrangement of the catalytic converter at a distance of less than 70 cm, preferably of less than 50 cm, and very particularly preferably of less than 30 cm, from the exhaust-gas outlet of the cylinder of the engine. The close-coupled catalytic converter is preferably arranged directly downstream of the point where the exhaust manifold merges into the exhaust line. Alternatively, the close-coupled catalytic converter may be divided into a plurality of small catalytic converters which are arranged in each individual exhaust manifold. The further, downstream catalytic converters are therefore situated in the exhaust section at a corresponding distance downstream of the first close-coupled catalytic converter.

EXPLANATION OF THE FIGURES

I) during the operating state of lean operation (OP-lean), each nitrogen oxide storage catalytic converter (3, 5 and 7) is monitored, firstly as to whether said nitrogen oxide storage catalytic converter has a sufficient level of nitrogen oxide storage activity under the present conditions, and secondly as to whether a nitrogen oxide threshold value is attained.

IIa) If both conditions for the nitrogen oxide storage catalytic converter (3) are met, then the switch (RGN-Start1) of the engine controller (2), and consequently also of the lean-burn engine (1), takes place into the operating state (OP-RGN1), for the regeneration of the nitrogen oxide storage catalytic converter (3). In said operating state (OP-RGN1), rich exhaust gas is emitted by the engine (2) and it is monitored by means of the gas sensor (4) as to whether the criterion for the termination of the regeneration is met. If the condition is met, then the switch (RGN-Stop1) takes place back into the operating state (OP-lean).

IIb) If both conditions for the nitrogen oxide storage catalytic converter (5) are met, then the switch (RGN-Start2) of the engine controller (2), and consequently also of the lean-burn engine (1), takes place into the operating state (OP-RGN2), for the regeneration of the nitrogen oxide storage catalytic converters (3 and 5). In said operating state (OP-RGN2), rich exhaust gas is emitted by the engine (2) and it is monitored by means of the gas sensor (6) as to whether the criterion for the termination of the regeneration is met. If the condition is met, then the switch (RGN-Stop2) takes place back into the operating state (OP-lean).

IIc) If both conditions for the nitrogen oxide storage catalytic converter (7) are met, then the switch (RGN-Start3) of the engine controller (2), and consequently also of the lean-burn engine (1), takes place into the operating state (OP-RGN3), for the regeneration of the nitrogen oxide storage catalytic converters (3, 5 and 7). In said operating state (OP-RGN3), rich exhaust gas is emitted by the engine (2) and it is monitored by means of the gas sensor (8) as to whether the criterion for the termination of the regeneration is met. If the condition is met, then the switch (RGN-Stop3) takes place back into the operating state (OP-lean).

EXAMPLES

In a test, two different regeneration strategies for a system composed of a close-coupled nitrogen oxide storage catalytic converter and an underbody nitrogen oxide storage catalytic converter were applied. In the first trial, the regeneration of the catalytic converters was commenced when a concentration of 100 ppm of nitrogen oxides downstream of the underbody nitrogen oxide storage catalytic converter was detected by means of the nitrogen oxide sensor (termination downstream of the underbody nitrogen oxide storage catalytic converter). In the second trial, the regeneration was commenced when 200 ppm of nitrogen oxides was measured downstream of the close-coupled nitrogen oxide storage catalytic converter (termination downstream of the close-coupled nitrogen oxide storage catalytic converter). FIGS. 6 and 7 show the corresponding nitrogen oxide and hydrocarbon conversions as a function of the average exhaust-gas temperatures in the close-coupled nitrogen oxide storage catalytic converter at the corresponding steady-state operating points of the engine.

It can be clearly seen that, primarily at low temperatures, a considerably improved reduction of nitrogen oxide and hydrocarbons can be observed when the system is regenerated only across the close-coupled nitrogen oxide storage catalytic converter. Furthermore, the emission of ammonia is prevented during the termination of the lean phase across the close-coupled nitrogen oxide storage catalytic converter; said ammonia is duly formed during the regeneration across the close-coupled nitrogen oxide storage catalytic converter, but is oxidized again, and stored, in the underbody nitrogen oxide storage catalytic converter.

The invention claimed is:

1. A method for the treatment of exhaust gases of a predominantly lean-operated internal combustion engine, having an exhaust-gas purification device which has a first nitrogen oxide storage catalytic converter, and downstream thereof in the same exhaust section, one or more further nitrogen oxide storage catalytic converters which are in each case arranged spatially separate from one another, wherein,
  a) the initiation of the rich phase for the regeneration of the nitrogen oxide storage catalytic converters takes place by attaining predefined nitrogen oxide threshold values downstream of the individual catalytic converters, and
  b) the termination of the rich phase for the regeneration of the nitrogen oxide storage catalytic converters is commenced when a certain lambda value is undershot downstream of the catalytic converter downstream of which the present rich phase was initiated as a result of the predefined nitrogen oxide threshold values being attained,
  c) with the respective predefined nitrogen oxide threshold values being selected to be progressively lower in the flow direction, and
  d) with a catalytic converter being considered by a control unit of the exhaust gas-purification device to be a nitrogen oxide storage catalytic converter only where it attains a predefined level of nitrogen oxide storage activity under the present conditions after the regeneration, and wherein, if the catalytic converter being considered does not attain a predefined level of nitrogen oxide storage activity under the present conditions after the regeneration, it is excluded from regeneration monitoring by the control unit.

2. The method according to claim 1, wherein, the desulphurization of the further catalytic converters is initiated if their temperature is >550° C.

3. The method of claim 1, wherein the first nitrogen oxide storage catalytic converter is close-coupled to a point where an exhaust manifold of the engine merges into an exhaust line of the exhaust gas purification device.

4. The method of claim 1, wherein the first nitrogen oxide storage catalytic converter is close-coupled to a point where an exhaust manifold of the engine merges into an exhaust line of the exhaust gas purification device, and wherein a spacing between adjacent nitrogen oxide catalytic converters is 40 to 150 cm.

5. The method of claim 1, wherein the respective predefined nitrogen oxide threshold values that are progressively lower in the flow direction differ by a factor of 1.5 to 15.

6. The method of claim 1 wherein, for all instances of initiation under a) and termination under b) for a catalytic converter considered by the control unit of the exhaust gas-purification device to be a nitrogen oxide storage catalytic converter, regeneration monitoring and termination of the initiated rich phase is limited to a looped rich phase monitoring of only that downstream, lower threshold nitrogen oxide storage catalyst which was the source of the initiation.

7. The method according to claim 1, wherein the respective, predefined oxide threshold value of each catalytic converter considered to be a nitrogen oxide storage catalytic converter by the control unit is monitored irrespective of the engine load present at the time of regeneration.

8. The method according to claim 1, wherein the catalytic converter that does not attain a predefined level of nitrogen oxide storage activity after regeneration is either maintained excluded by the control unit if it is irreversibly deactivated or incorporated back into a regulating circuit of the exhaust-gas purification device if a reduction in the nitrogen oxide storage activity is reversible and there is regained a predefined level of nitrogen oxide storage activity after regeneration in a subsequent regeneration monitoring cycle.

9. The method according to claim 1, wherein the first nitrogen oxide storage catalytic converter is within 30 cm from a point where an exhaust manifold of the engine merges into an exhaust line of the exhaust gas purification device.

10. The method according to claim 1,
  wherein,
  the nitrogen oxide storage activity is reduced as a result of an effect selected from the group consisting of excessively high temperature, as a result of thermal ageing and as a result of poisoning or combinations thereof.

11. The method according to claim 10,
  wherein,
  the respective nitrogen oxide threshold values are specified such that the nitrogen oxide threshold value downstream of the final catalytic converter lies below the relevant legal limit in the majority of operating states of the engine.

12. The method according to claim 10,
  wherein,
  the number of nitrogen oxide storage catalytic converters is selected such that the nitrogen oxide threshold value downstream of the final catalytic converter lies below the relevant legal limit in the majority of operating states of the engine.

13. The method according to claim 10,
  wherein,
  an SCR catalytic converter is situated downstream of one or more nitrogen oxide storage catalytic converters.

14. The method of claim 10, wherein the first nitrogen oxide storage catalytic converter is close-coupled to a point where an exhaust manifold of the engine merges into an exhaust line of the exhaust gas purification device.

15. The method according to claim 1,
  wherein,
  the respective nitrogen oxide threshold values are specified such that the nitrogen oxide threshold value downstream of the final catalytic converter lies below the relevant legal limit in the majority of operating states of the engine.

16. The method according to claim 15,
  wherein,
  the number of nitrogen oxide storage catalytic converters is selected such that the nitrogen oxide threshold value downstream of the final catalytic converter lies below the relevant legal limit in the majority of operating states of the engine, and wherein the first nitrogen oxide storage catalytic converter is close coupled to a point where an exhaust manifold of the engine merges into an exhaust line of the exhaust gas purification device, and there are a plurality of nitrogen oxide storage catalytic converters comprised of the first nitrogen oxide storage catalytic converter and at least second and third nitrogen oxide storage catalytic converters downstream of the close coupled nitrogen oxide storage catalytic converter, and said plurality of nitrogen oxide storage catalytic converters have pre-selected nitrogen oxide threshold values that progressively step down in a downstream direction along a characteristic curve.

17. The method according to claim 15,
wherein,
an SCR catalytic converter is situated downstream of one or more nitrogen oxide storage catalytic converters.

18. The method of claim 15, wherein the first nitrogen oxide storage catalytic converter is close-coupled to a point where an exhaust manifold of the engine merges into an exhaust line of the exhaust gas purification device.

19. The method according to claim 1,
wherein,
the number of nitrogen oxide storage catalytic converters is selected such that the nitrogen oxide threshold value downstream of the final catalytic converter lies below the relevant legal limit in the majority of operating states of the engine.

20. The method according to claim 19,
wherein,
an SCR catalytic converter is situated downstream of one or more nitrogen oxide storage catalytic converters.

21. The method according to claim 1,
wherein,
an SCR catalytic converter is situated downstream of one or more nitrogen oxide storage catalytic converters.

22. The method according to claim 21,
wherein,
the termination of the rich phase for the regeneration of the nitrogen oxide storage catalytic converters is initiated only when a certain lambda value is undershot downstream of the respective SCR catalytic converter.

23. The method according to claim 1,
wherein,
a desulphurization process is initiated if the temperature of the close-coupled nitrogen oxide storage catalytic converter is >600° C.

24. The method according to claim 23,
wherein,
the sulphur-containing exhaust gas which is generated is conducted past one or more downstream nitrogen oxide storage catalytic converter(s) by means of a bypass line.

25. A method for the treatment of exhaust gases of a predominantly lean-operated internal combustion engine, having an exhaust-gas purification device which has a first nitrogen oxide storage catalytic converter, and downstream thereof in the same exhaust section, one or more further nitrogen oxide storage catalytic converters which are in each case arranged spatially separate from one another, wherein there is carried out a regulation strategy that includes:
   a) during a lean operation state of the engine, and for each of said nitrogen oxide storage catalytic converters, a monitoring under present conditions of (i) whether each nitrogen oxide storage catalytic converter has a predefined level of nitrogen oxide storage activity, and, if (i) is satisfied, (ii) whether a respective, predefined nitrogen oxide threshold value is attained downstream of the individual catalytic converter satisfying (i);
   b) the initiation of the rich phase for the regeneration of the nitrogen oxide storage catalytic converters takes place by attaining the respective predefined nitrogen oxide threshold values downstream of the individual catalytic converters, and
   c) the termination of the rich phase for the regeneration of the nitrogen oxide storage catalytic converters is commenced when a certain lambda value is undershot downstream of the catalytic converter for which the present rich phase was initiated as a result of the predefined nitrogen oxide threshold value being attained,
   d) with the respective predefined nitrogen oxide threshold values being pre-selected under the regulation strategy to be progressively lower in the flow direction, and
   e) when any one of the nitrogen oxide storage catalytic converters being monitored under (i) is deemed not to meet the predefined level of nitrogen oxide storage activity under the present conditions, it is excluded from consideration under (ii) for each regeneration cycle in which it is determined not to satisfy (i).

26. The method of claim 25 wherein there are at least three nitrogen oxide storage catalysts being monitored under (i), and the preselected nitrogen oxide threshold value that triggers initiation of the rich phase for the second in line catalyst falls, in value, between the preselected values for the first and third in line nitrogen oxide storage catalysts being monitored under (i).

27. The method of claim 25 wherein a previously excluded nitrogen oxide storage catalyst that is found in a more current monitoring to satisfy (i), is incorporated back in the regulation strategy and considered under (ii).

* * * * *